(12) United States Patent
Brown et al.

(10) Patent No.: US 8,117,163 B2
(45) Date of Patent: Feb. 14, 2012

(54) BACKUP AND RESTORE SYSTEM FOR A COMPUTER

(75) Inventors: Andrew P. Brown, Glasgow (GB); Jeffry C. Flowers, Marblehead, MA (US)

(73) Assignee: Carbonite, Inc., Boston, MA (US)

( * ) Notice: Subject to any disclaimer, the term of this patent is extended or adjusted under 35 U.S.C. 154(b) by 696 days.

(21) Appl. No.: 11/926,946

(22) Filed: Oct. 29, 2007

(65) Prior Publication Data
US 2008/0133622 A1    Jun. 5, 2008

Related U.S. Application Data

(60) Provisional application No. 60/863,696, filed on Oct. 31, 2006.

(51) Int. Cl.
*G06F 17/30* (2006.01)
(52) U.S. Cl. .................. 707/640; 707/610; 707/674
(58) Field of Classification Search .................. None
See application file for complete search history.

(56) References Cited

U.S. PATENT DOCUMENTS

| | | | |
|---|---|---|---|
| 5,301,348 A | 4/1994 | Jaaskelainen | |
| 5,333,256 A | 7/1994 | Green et al. | |
| 6,088,030 A | 7/2000 | Bertram et al. | |
| 6,104,397 A | 8/2000 | Ryan et al. | |
| 6,611,850 B1 * | 8/2003 | Shen | 1/1 |
| 6,993,404 B2 | 1/2006 | Lev-Ami et al. | |
| 7,228,506 B2 | 6/2007 | Ivanovic et al. | |
| 2002/0087588 A1 * | 7/2002 | McBride et al. | 707/204 |
| 2002/0122077 A1 | 9/2002 | Doney et al. | |
| 2003/0103088 A1 | 6/2003 | Dresti et al. | |
| 2005/0114412 A1 | 5/2005 | Gerhard | |
| 2005/0114711 A1 * | 5/2005 | Hesselink et al. | 713/201 |
| 2005/0131990 A1 * | 6/2005 | Jewell | 709/201 |
| 2006/0106708 A1 * | 5/2006 | Abushaban et al. | 705/37 |
| 2006/0225065 A1 | 10/2006 | Chandhok et al. | |
| 2007/0220103 A1 | 9/2007 | Rogers et al. | |
| 2009/0254829 A1 | 10/2009 | Rohde | |

OTHER PUBLICATIONS

Mozy. "Mozy Beta User Guide." Mozy.com, Jul. 6, 2006. <http://web.archive.org/web/20060706231749/mozy.com/support/userguide>.*
Pash, Adam. "Hack Attack: Using Subversion with TortoiseSVN." Lifehacker.com, Aug. 8, 2006. <http://lifehacker.com/192367/hack-attack-using-subversion-with-tortoisesvn>.*
ABC Backup. "ABC Backup Features." ABCBackup.com, Aug. 25, 2006. <http://web.archive.org/web/20060825155101/http://www.abcbackup.com/features.htm>.*
ATopSoft. "ATopSoft AutoSave." ATopSoft.com, Sep. 11, 2006. <http://web.archive.org/web/20060911213102/http://www.atopsoft.com/products/autosave/>.*
TortoiseSVN. "Context menus in Windows Explorer." Tortoisesvn.tigris.org, Sep. 25, 2006. <http://web.archive.org/web/20060925040147/http://tortoisesvn.tigris.org/ExplorerIntegration.html>.*

(Continued)

*Primary Examiner* — Mohammad Ali
*Assistant Examiner* — Syed Hasan
(74) *Attorney, Agent, or Firm* — Foley & Lardner LLP

(57) ABSTRACT

A method of defining a backup state of a file system is provided. A change in an electronic file stored on a computer system is detected. If the change is detected, a backup state of the electronic file is updated using an overlay icon associated with the electronic file. The overlay icon is presented in a user interface displaying the file system of the computer system. The backup state indicates that the electronic file is selected for backup processing if the change is detected. If the backup state indicates the electronic file is selected for backup processing, a copy of the electronic file is sent to a second computer system accessible by the computer system using a network.

20 Claims, 13 Drawing Sheets

OTHER PUBLICATIONS

Campbell, David. "Extending the Windows Explorer with Name Space Extensions." Microsoft Systems Journal, Jul 1996. <https://65.55.21.250/msj/archive/S332.aspx>.*

TortoiseCVS. "TortoiseCVS User's Guide." N.p., Jan. 9, 2005. Web. Jun. 30, 2011. <http://web.archive.org/web/20050109034319/http://www.tortoisecvs.org/UserGuide_en.chm>.*

* cited by examiner

| ADDRESS | 🖥 MY COMPUTER | | ▶ | ↑ | GO |

500

| SYSTEM TASKS | « |
|---|---|
| 🔍 VIEW SYSTEM INFORMATION | |
| 🗑 ADD OR REMOVE PROGRAMS | |
| ⚙ CHANGE A SETTING | |

| OTHER PLACES | « |
|---|---|
| 🖧 MY NETWORK PLACES | |
| 📁 MY DOCUMENTS | |
| 🎛 CONTROL PANEL | |

| DETAILS | « |
|---|---|
| MY COMPUTER | |
| SYSTEM FOLDER | |

504

| NAME | TYPE | TOTAL SIZE | COMMENTS |
|---|---|---|---|
| HARD DISK DRIVES | | | |
| ◇ LOCAL DISK (C:) | LOCAL DISK | 93.1 GB | |
| DEVICES WITH REMOVABLE STORAGE | | | |
| ◇ DVD-RAM DRIVE (D:) | CD DRIVE | | |
| NETWORK DRIVES | | | |
| ⚙ FIRM APPLICATIONS (F:) | NETWORK DRIVE | 326 GB | |
| ⚙ FIRM DATA (G:) | NETWORK DRIVE | 326 GB | |
| OTHER | | | |
| ◉ CARBONITE SECURE BACKUP | SYSTEM FOLDER | | DOUBLE-CLICK THIS TO MANAGE AND RESTORE THE FILES |

| NAME | STATE | LAST BACKED UP | VERSION | DATE | # FILES | SIZE |
|---|---|---|---|---|---|---|
| A | FOLDER BACKED UP | | | | 14 | 92 KB |
| B | FOLDER BACKED UP | | | | 16 | 6 MB |
| DOC | FOLDER BACKED UP | | | | 801 | 40 MB |
| C | FOLDER BACKED UP | | | | 2352 | 88 MB |
| D | FOLDER BACKED UP | | | | 1 | 80 B |
| E | FOLDER BACKED UP | | | | 1161 | 13 MB |
| F | FOLDER BACKED UP | | | | 176 | 2 MB |
| G | FOLDER BACKED UP | | | | 15 | 3 MB |
| H | FOLDER BACKED UP | | | | 93 | 45 MB |
| I | FOLDER BACKED UP | | | | 4639 | 626 MB |
| J | FOLDER BACKED UP | | | | 2 | 28 B |
| K | FOLDER BACKED UP | | | | 832 | 18 MB |
| L | FOLDER BACKED UP | | | | 11 | 10 KB |
| M.RND | FOLDER BACKED UP | 7/5/2006 4:24 PM | 1 | | 1 | 1 KB |
| N.BAT | FOLDER BACKED UP | 7/5/2006 4:24 PM | 1 | | 1 | 0 B |
| O.VER | FOLDER BACKED UP | 7/5/2006 4:24 PM | 1 | | 1 | 308 B |
| P.BIN | FOLDER BACKED UP | 7/5/2006 4:24 PM | 1 | | 1 | 4 KB |
| Q.TXT | FOLDER BACKED UP | 7/5/2006 4:24 PM | 2 | | 1 | 60 B |
| R.NET | FILE PENDING BACKUP | 7/17/2006 8:30 PM | 1 | | 1 | 12 KB |
| S.VER | FILE BACKED UP | 7/5/2006 4:24 PM | 1 | | 1 | 374 B |
| T | FILE BACKED UP | 7/5/2006 4:24 PM | | | 1 | 10 B |

FOLDERS
- SECURE BACKUP
  - C:
    - A
    - B
    - DOC
    - C
    - D
    - E
    - F
    - G
    - H
    - I
    - J
    - K
    - L
  - DESKTOP
  - MY DOCS
    - FAV
    - F&L
    - LKS

| NAME | SIZE | TYPE | DATE MODIFIED |
|---|---|---|---|
| BACKUP | | FILE FOLDER | 6/27/2006 9:46 AM |
| A | | FILE FOLDER | 6/22/2006 10:26 AM |
| B | | FILE FOLDER | 10/2/2006 12:56 PM |
| DOC | | FILE FOLDER | 6/22/2006 9:06 AM |
| C | | FILE FOLDER | 6/22/2006 9:24 AM |
| D | | FILE FOLDER | 5/17/2006 4:45 PM |
| E | | FILE FOLDER | 5/17/2006 4:45 PM |
| F | | FILE FOLDER | 6/27/2006 11:21 AM |
| G | | FILE FOLDER | 8/31/2006 3:42 PM |
| H | | FILE FOLDER | 9/12/2006 4:08 PM |
| I | | FILE FOLDER | 10/4/2006 8:49 AM |
| J | | FILE FOLDER | 6/22/2006 9:06 AM |
| K | | FILE FOLDER | 10/4/2006 8:36 AM |
| L | | FILE FOLDER | 12/3/2002 3:14 PM |
| 1 | | FILE FOLDER | 9/24/2006 12:38 PM |
| 2 | | FILE FOLDER | 5/17/2006 4:36 PM |
| M.RND | 1 KB | RND FILE | 6/22/2006 9:25 AM |
| O.VER | 1 KB | VER FILE | 5/17/2006 4:43 PM |
| 3 | 9 KB | TEXT DOC | 5/17/2006 5:11 PM |
| P.BIN | 4 KB | BIN FILE | 1/16/2003 11:11 AM |
| Q.TXT | 1 KB | TEXT DOC | 5/17/2006 4:43 PM |

| ADDRESS | ⊙ SECURE BACKUP | | | ▼ | ↑ GO |
|---|---|---|---|---|---|
| NAME | STATE | LAST BACKED UP | VERSION | DATE | #FILES | SIZE |
| | FOLDER BACKED UP | | | 10123 | | 846 MB |
| | FOLDER BACKED UP | | | 5 | | 123 KB |
| | FOLDER BACKED UP | | | 69 | | 141 KB |

Popup menu 1104:
- OPEN — 1110
- EXPLORE — 1112
- RESTORE
- RESTORE TO...
- DO NOT BACKUP — 1114

| ADDRESS | □ SECURE BACKUP \ C:\ DOC | | | | ▼ | ↑ GO |
|---|---|---|---|---|---|---|
| NAME | STATE | LAST BACKED UP | VERSION | SAMPLE PICTURES | DATE | #FILES | SIZE |
| ⊞ BLUE HILLS.JPG | FILE BACKED UP | 7/5/2006 4:27 | 1 | | | 1 | 27 KB |
| | E BACKED UP | 7/5/2006 4:27 | 1 | | | 1 | 69 KB |
| | E BACKED UP | 7/5/2006 4:27 | 1 | | | 1 | 81 KB |
| | E BACKED UP | 7/5/2006 4:27 | 1 | | | 1 | 103 KB |

Popup menu 1202:
- RESTORE — 1206
- RESTORE TO...
- DO NOT BACKUP 1200, 1102, 1204, 1208, 1210

BACKUP AND RESTORE SYSTEM FOR A COMPUTER

CROSS-REFERENCE TO RELATED APPLICATIONS

This application claims the benefit of U.S. Provisional Patent Application Ser. No. 60/863,696 that was filed Oct. 31, 2006, the disclosure of which is incorporated by reference in its entirety.

FIELD

The field of the disclosure relates generally to computer systems. More specifically, the disclosure relates to a backup and restore system for a computer system.

BACKGROUND

Computer systems are ubiquitous in today's work and home environments. The data stored on these computer systems, however, is vulnerable to theft, fire, flood, and other natural disasters. Backup software and procedures for backing up electronic files on computer systems generally are known. However, as an example, only 2% of home personal computers (PCs) are backed up regularly. PC users can perform their own backups using various media such as compact disks (CDs) or external hard drives. CDs and external hard drives can be expensive and also are vulnerable to theft, fire, flood, and other natural disasters. Traditional online backup services cost at least $100 per year, offer only limited capacity, and generally require user interaction with backup software, for example, to schedule backup processing. The requirement for user interaction may lead to confusion for unsophisticated computer users. Thus, there is a need for a backup and restore system that requires little if any interaction by the user.

SUMMARY

Exemplary embodiments provide a backup and restore system for a computer system that requires little if any interaction by the user. The exemplary embodiments further provide a simple, safe, online backup system for computer users. Some or all of the data on a computer system can be backed up whenever the computer system is connected to a network such as the Internet.

An exemplary method of defining a backup state of a file system is provided. A change in an electronic file stored on a computer system is detected. If the change is detected, a backup state of the electronic file is updated using an overlay icon associated with the electronic file. The overlay icon is presented in a user interface displaying the file system of the computer system. The backup state indicates that the electronic file is selected for backup processing if the change is detected. If the backup state indicates the electronic file is selected for backup processing, a copy of the electronic file is sent to a second computer system accessible by the computer system using a network.

In another exemplary embodiment, a computer-readable medium is provided comprising computer-readable instructions that, upon execution by a processor, cause the processor to perform the operations of the method of defining a backup state of a file system.

In yet another exemplary embodiment, a device is provided. The device includes, but is not limited to, a processor, a communication interface, and the computer-readable medium. The communication interface operably couples to the processor to send a copy of an electronic file to a second computer system using a network. The computer-readable medium operably couples to the processor. The computer-readable medium comprises instructions that, upon execution by the processor, perform the operations of the method of defining a backup state of a file system.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 5 depicts a first user interface of a file system in accordance with an exemplary embodiment.

FIG. 6 depicts a second user interface of the file system in accordance with an exemplary embodiment.

FIG. 7 depicts a third user interface of the file system in accordance with an exemplary embodiment.

FIG. 11 depicts a fifth user interface of the file system in accordance with an exemplary embodiment.

FIG. 12 depicts a sixth user interface of the file system in accordance with an exemplary embodiment.

DETAILED DESCRIPTION

Figure 1:
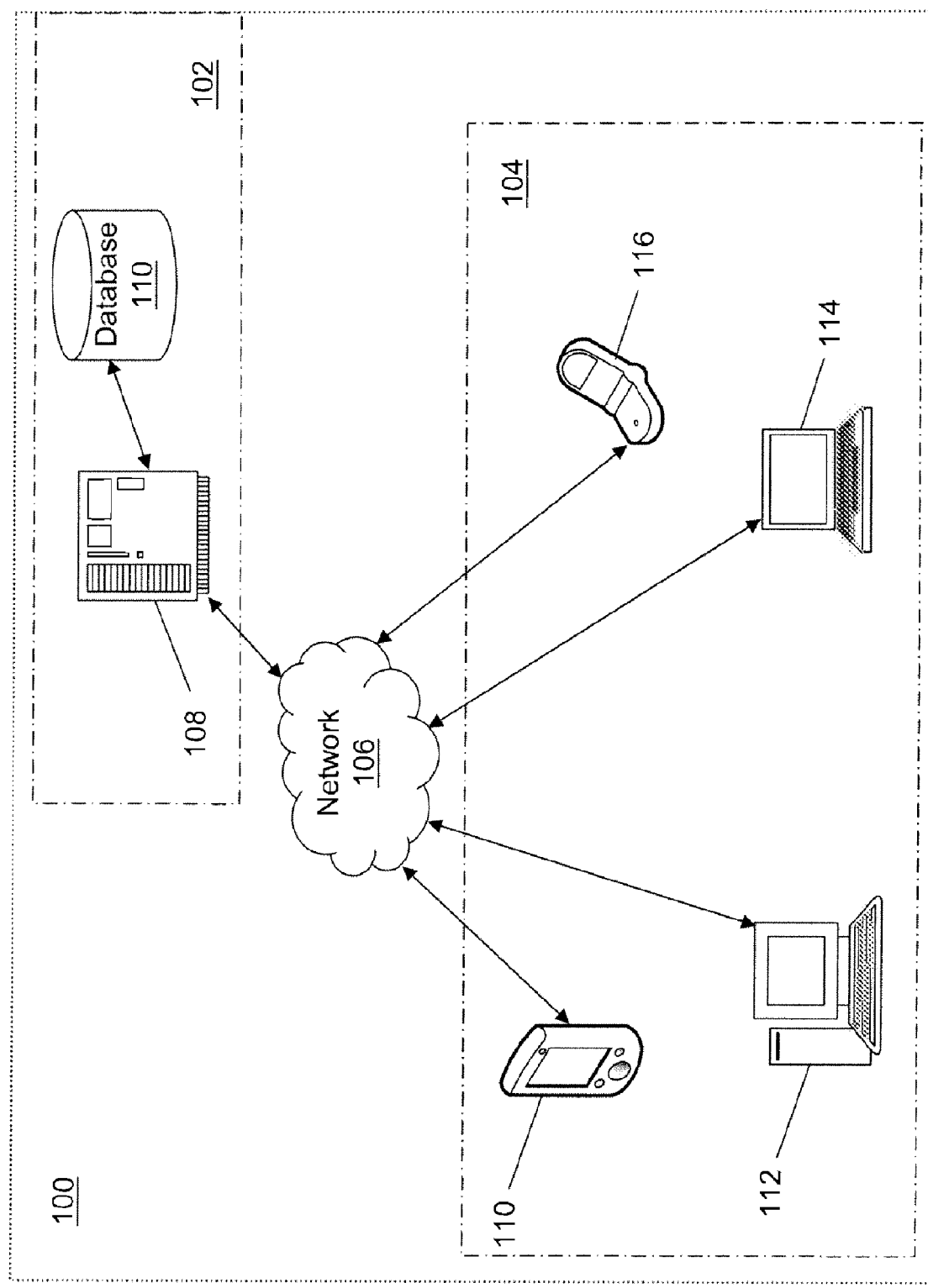
FIG. 1 depicts a system that includes devices implementing a backup and restore system in accordance with an exemplary embodiment.

With reference to FIG. 1, a system diagram of a backup and restore system 100 is shown in accordance with an exemplary embodiment. Backup and restore system 100 may include a server system 102, a plurality of computing devices 104, and a network 106. There may be fewer or additional networks in backup and restore system 100. For example, backup and restore system 100 may include a cellular network. Server system 102 may include a server 108 and a database 110.

In backup and restore system 100, the plurality of computing devices 104 send and receive signals through network 106 to/from server 108. Backup and restore system 100 can include any number and type of computing devices 104 that may be organized into subnets. The plurality of computing devices 104 may include computers of any form factor such as a laptop 116, a desktop 114, an integrated messaging device, a personal digital assistant 112, a cellular telephone 118, etc. Backup and restore system 100 may include additional types of devices. The plurality of computing devices 104 communicate using various transmission media that may be wired or wireless.

Server 108 includes or can access database 110 either through a direct connection or through a second network. Database 110 may include a plurality of databases that may be organized into multiple database tiers to improve data management and access. Database 110 is a data repository for backup and restore system 100. Database 110 may utilize various database technologies and a variety of different formats as known to those skilled in the art including a simple file system, a relational database, and/or a system of tables, etc.

Figure 14:
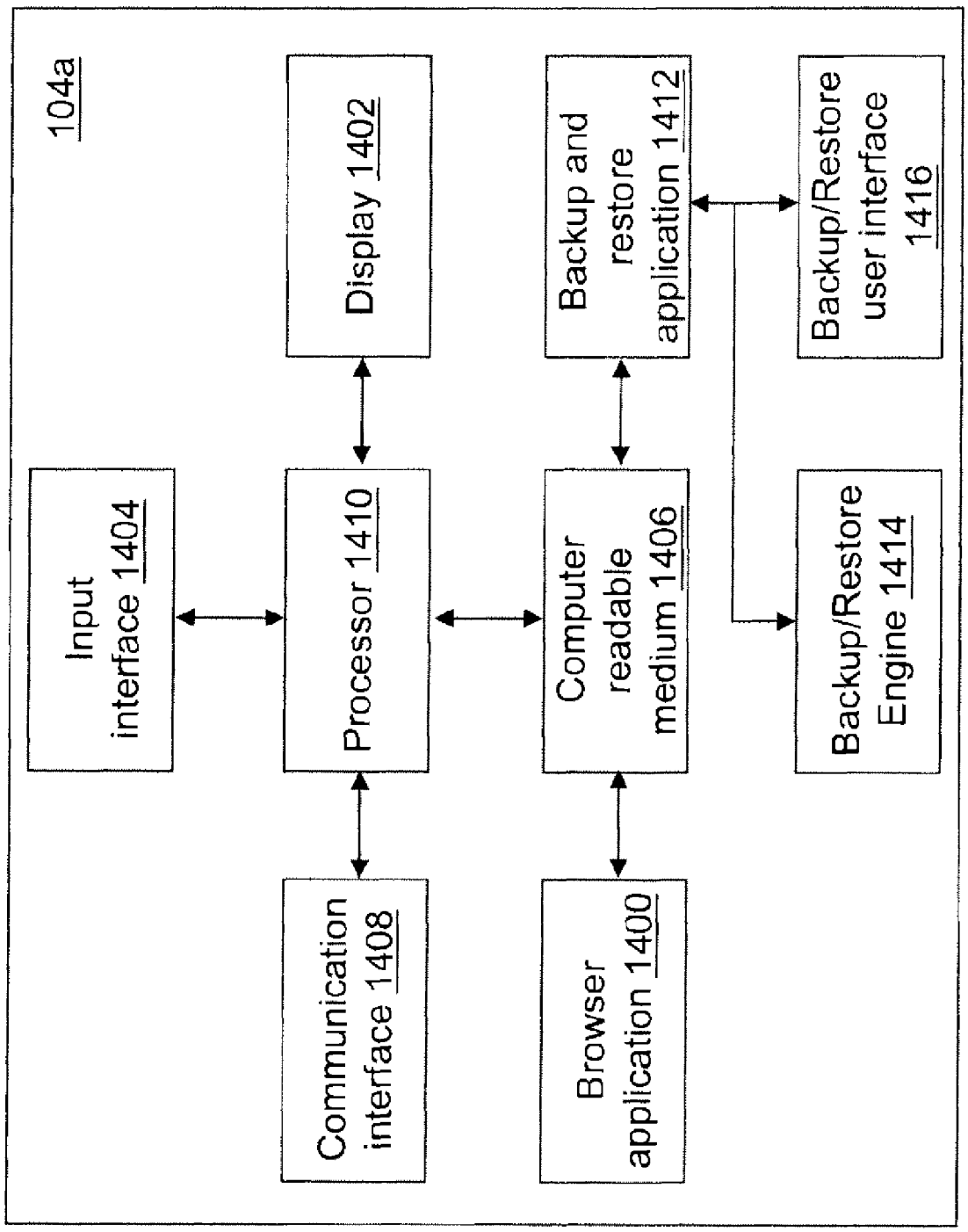
FIG. 14 is a block diagram of a first device executing the backup and restore system in accordance with an exemplary embodiment.
Figure 15:
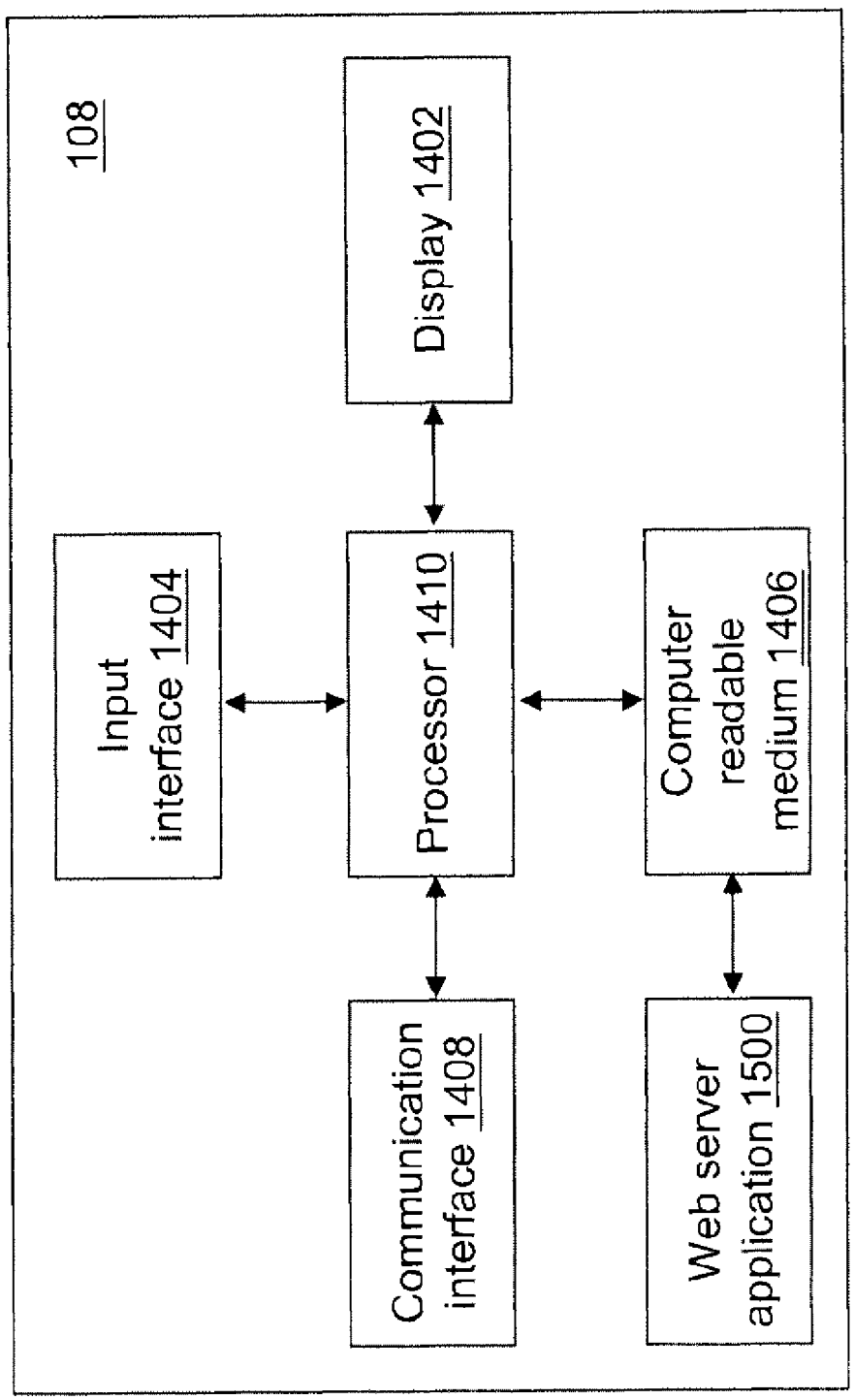
FIG. 15 is a block diagram of a second device in communication with the first device to support the backup and restore of electronic files at the first device of FIG. 14 in accordance with an exemplary embodiment.

In an exemplary embodiment, network 106 is the Internet. With reference to FIGS. 14 and 15, a user may use a browser application 1400 installed at an exemplary computing device 104*a* to access a web server application 1500 hosted at server 108. Through interaction with web server application 1500, the user may download and install a backup and restore application 1412 at exemplary computing device 104*a*. Web server application 1500 may control the display of multiple web pages that present information to the user and from which the user may make selections. A web page may contain links to other web pages with related or additional information. Each web page is identified by a uniform resource locator that includes the location or address of the computer that contains the resource to be accessed in addition to the location of the resource on that computer. The type of file or resource depends on the Internet application protocol. For example, the Hypertext Transfer Protocol (HTTP) may describe a web page to be accessed with browser application 1400.

After installation of backup and restore application 1412 at exemplary computing device 104*a*, one or more processes may be instantiated at exemplary computing device 104*a* to support the operations associated with backup and restore application 1412. Message transmissions between the plurality of computing devices 104 and server 108 using network 106 may be transmitted using HTTP over secure sockets layer (HTTPS).

Figure 2:
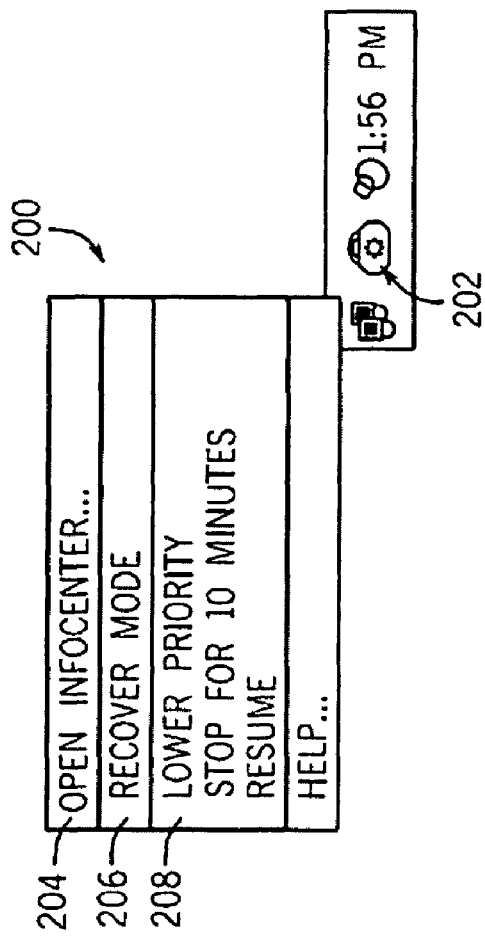
FIG. 2 depicts a menu list of a backup and restore application in accordance with an exemplary embodiment.

With reference to FIGS. 2 and 14, a menu list 200 for backup and restore application 1412 is provided in accordance with an exemplary embodiment. Menu list 200 may be accessed, for example, by right-clicking on an application icon 202 in a system tray of exemplary computing device 104*a* after installation of backup and restore application 1412. Application icon 202 may change color or shape to indicate an overall status of the backup processing at exemplary computing device 104*a*. For example, application icon 202 may change to a green color to indicate all files selected for backup are currently backed up. Application icon 202 may change to a yellow color to indicate that files are currently being backed up. Application icon 202 may change to a red color to indicate that there is a problem associated with execution of backup and restore application 1412.

Menu list 200 may include an open menu item 204, a recover mode menu item 206, and a priority menu item 208. Menu list 200 may include fewer or additional menu items. A user may select any of open menu item 204, recover mode menu item 206, and priority menu item 208 using an input interface 1404 from menu list 200 as known to those skilled in the art. Selection of open menu item 204 opens a user interface window of backup and restore application 1412.

Selection of recover mode menu item 206 causes backup and restore application 1412 to enter the recover mode. The recover mode, for example, may be used when a user purchases a new computing device or replaces the hard drive in the current computing device. Recover mode may be continued as long as needed, but no backup is performed while backup and restore application 1412 is in the recover mode. Without an entry into the recover mode, backup and restore application 1412 may determine that all of the files on exemplary computing device 104*a* have been deleted and that the user would like to remove the files from backup.

After the files have been restored to the new computing device or the new hard drive, backup and restore application 1412 may automatically exit the recover mode. Alternatively, a user may discontinue the recover mode by de-selecting recover mode menu item 206. In an exemplary embodiment, application icon 202 in the system tray may change color or shape to indicate entry into the recover mode. An alert may be displayed in a user interface window of backup and restore application 1412 to advise the user that backup processing has been suspended.

Selection of priority menu item 208 causes backup and restore application 1412 to slow down its use of network 206 to avoid interference with other network-intensive hardware/software. For example, upon selection of priority menu item 208, backup and restore application 1412 may detect activity at exemplary computing device 104*a*. If activity is detected, backup processing may be stopped or the priority of backup processing reduced.

Figure 3:
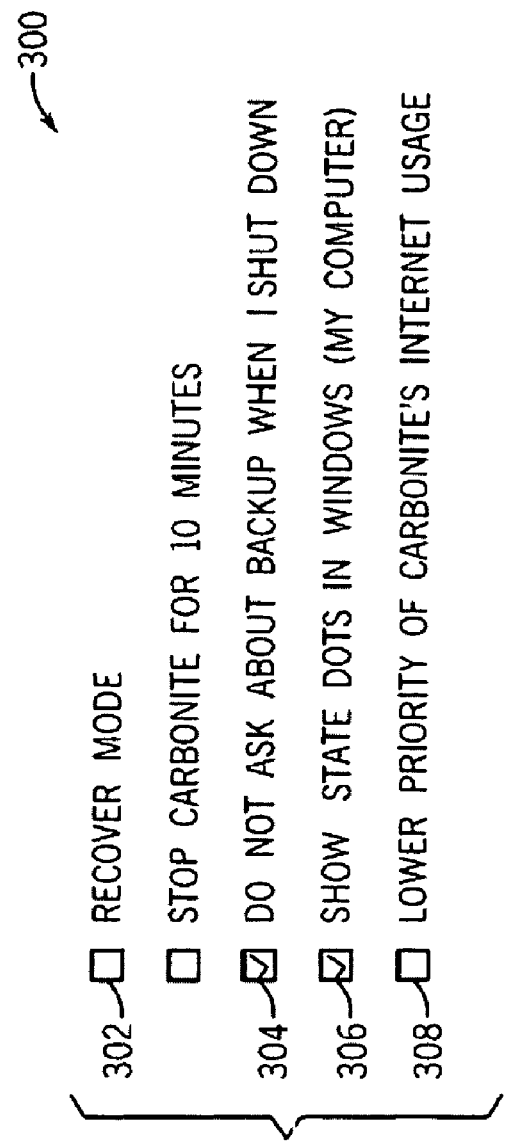
FIG. 3 depicts a user interface of a backup and restore application in accordance with an exemplary embodiment.

Double-clicking on application icon 202 may open a user interface window of backup and restore application 1412 which provides detailed information associated with backup and restore application 1412. For example, with reference to FIGS. 3 and 14, a user interface window 300 of backup and restore application 1412 is provided in accordance with an exemplary embodiment. Backup and restore application 1412 may include additional user interface windows. User interface window 300 also may be accessed, for example, by selecting open menu item 204 from menu list 200. User interface window 300 may include a recover mode check box 302, a shutdown check box 304, a state indicator check box 306, and a priority check box 308. User interface window 300 may include fewer or additional check boxes or other user interface controls. A user may select any of recover mode check box 302, shutdown check box 304, state indicator check box 306, and priority check box 308 using input interface 1404.

Selection of recover mode check box 302 causes backup and restore application 1412 to enter the recover mode. Selection of shutdown check box 304 causes backup and restore application 1412 to suspend presentation of a text box to the user when the user shuts down exemplary computing device 104*a*. If shutdown check box 304 is not selected, a text box is presented to the user to ask if exemplary computing device 104*a* should be backed up before shutting down exemplary computing device 104*a*. Selection of state indicator check box 306 causes backup and restore application 1412 to show the backup status of electronic files in a user interface displaying a file system of exemplary computing device 104*a*. Selection of priority check box 308 causes backup and restore application 1412 to slow down its use of network 206 to avoid interference with other network-intensive hardware/software.

Figure 4:
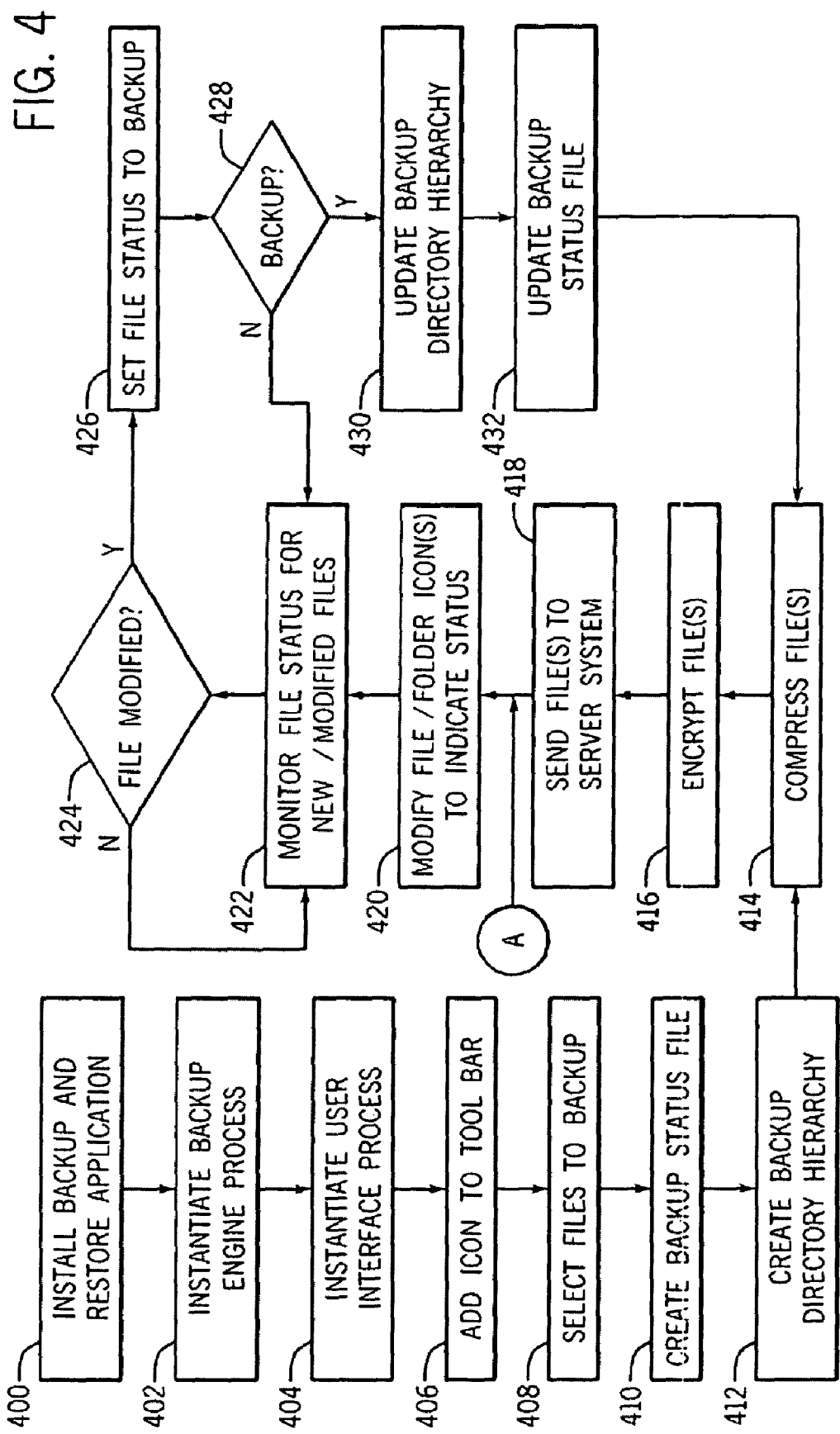
FIG. 4 is a flow diagram illustrating exemplary operations performed by a backup application in accordance with an exemplary embodiment.

With reference to FIGS. 1, 2, 4 and 14, exemplary operations associated with a backup process are described. Additional, fewer, or different operations may be performed, depending on the embodiment without deviating from the spirit of the invention. The order of presentation of the operations of FIG. 4 is not intended to be limiting. In an operation 400, backup and restore application 1412 is installed at exemplary computing device 104a. Backup and restore application 1412 may be downloaded and installed from a web page as known to those skilled in the art. In an operation 402, a first process executing a backup/restore engine 1414 is instantiated. The first process controls the monitoring of files to backup and the transmission of files to server 108. In an operation 404, a second process executing a backup/restore user interface 1416 is instantiated. In an exemplary embodiment, the second process initiates a registration process at exemplary computing device 104a, connects to server 108, registers exemplary computing device 104a with server 108, downloads activation data from server 108, and starts backup service processing.

Backup/restore engine 1414 and backup/restore user interface 1416 run in the background at exemplary computing device 104a to ensure that new and/or modified electronic files are backed up. Backup operations, however, may automatically be reduced to a low priority mode (for example, by selection of priority menu item 208) when a user is actively using exemplary computing device 104a and may be increased when exemplary computing device 104a is idle. For example, backup/restore engine 1414 may detect keyboard and mouse activity to determine whether or not a user is actively using exemplary computing device 104a and to limit backup processing during active use. Backup processing may be reduced or stopped until expiration of a predetermined period of time during which no activity is detected. For example, backup/restore engine 1414 may "go to sleep" until two minutes of inactivity have been detected. Additionally or in the alternative, backup and restore application 1412 may reduce the packet size and/or may suspend packet streaming during active use. For example, the packet size may be reduced from 8,000 bytes to 1,400 bytes. Instead of packet streaming, a single packet may be sent at a time. After acknowledgement, another packet may be sent. After expiration of a predetermined period of time during which no activity is detected, backup operations may be reinitiated and or the priority of backup processing increased. For example, after expiration of the predetermined period of time during which no activity is detected, the packet size may be increased from 1,400 bytes to 8,000 bytes and packet streaming may be used.

Use of a low priority mode when a user is using exemplary computing device 104a prevents backup and restore application 1412 from slowing down other applications executing at exemplary computing device 104a or from slowing down Internet browsing. Prior art backup products require a user to schedule backup execution times. Using backup and restore application 1412, the backup may run all the time, but slow or even stop execution whenever exemplary computing device 104a is being used for anything else.

In an operation 406, application icon 202 is added to the system tray of exemplary computing device 104a as known to those skilled in the art. In an operation 408, files are selected for backup to server system 102. For example, as part of the installation process, a user may select from a plurality of options for selecting the files to backup. The options may be presented to the user using web server application 1500. In an exemplary embodiment, a user can select an option listing one or more predefined folders for backup. For example, if exemplary computing device 104a is executing a Windows® operating system, the "My Documents" and "Desktop" folder may be predefined for backup as an option presented to a user. In an exemplary embodiment, a user can select an option not to backup any files automatically. If a user selects this option, the user may individually selects the files, folders, and/or drives in the file system of exemplary computing device 104a for backup. In an exemplary embodiment, a user can select an option to backup all electronic files on exemplary computing device 104a.

In an exemplary embodiment, a user can select an option to backup certain file types automatically or not to backup certain file types automatically. For example, all image files may be selected for backup while all executable files are not selected for backup. Additionally, certain file/folder/drive types may be excluded from backup automatically. For example, executable files, dynamic link library files, temporary folders, hidden system folders, and non-permanent disk drives such as network and removable drives may be excluded from backup.

The files selected for backup are determined based on the option(s) selected by the user. This information may be captured in a backup profile defined for the computer system as part of the installation process. For example, the backup profile may be included with the activation data downloaded from server 108. The backup profile determines whether a file is, by default, included or excluded from backup processing.

In an operation 410, a backup status file is created to maintain the backup status and backup state information for each file selected for backup. In an exemplary embodiment, the backup status file includes a full path and filename for a file, a unique identifier for the file, a date of last backup of the file, a time of last backup of the file, a creation time of the file, a most recent modification time for the file, a compressed file size of the file, an uncompressed file size of the file, and a backup state flag indicating a backup state of the file. Backup status information includes the date of last backup of the file, the time of the last backup of the file, and the most recent modification time. The unique identifier for the file may include a unique identifier for exemplary computing device 104a, a session identifier, a file identifier, and a file version number. In an exemplary embodiment, server 108 constructs a folder and filename from the unique identifier. For example, the unique identifier may be 'C317-S342-F000771-V000002' and the constructed folder and filename may be C:\C317\S342\C317-S342-F000771-V000002, where 'C317' is the unique identifier for exemplary computing device 104a, 'S342' is the session identifier, 'F000771' is the file identifier, and 'V000002' is the file version number. Backup state information includes whether or not the file is to be backed up, is awaiting backup, is to be removed from backup, etc. Additional files may be created. For example, various log files may be created to facilitate the diagnosis of errors that may occur during execution of backup and restore application 1412. Additionally, encryption data/digests may be captured in files stored at exemplary computing device 104a.

In an operation 412, a backup directory hierarchy is created. The backup directory hierarchy includes a user interface that indicates a hierarchy of files, folders, and/or drives selected for backup and is displayed in a file system user interface of exemplary computing device 104a. The backup directory hierarchy shows the same folder structure as the physical drive of exemplary computing device 104a. As known to those skilled in the art, the drives may be internal hard drives, external hard drives, external media drives of various types, network drives, etc.

With reference to FIGS. 5 and 14, a first user interface 500 of the file system user interface application of exemplary computing device 104a is provided. The first user interface 500 includes a virtual folder 502 and a task pane 504. In an exemplary embodiment, the file system user interface application is the Windows Explorer® application which provides a graphical user interface for accessing the file system of exemplary computing device 104a. The backup directory hierarchy created is presented to a user through interaction with virtual folder 502.

Selection of virtual folder 502 in first user interface 500 causes the next level in the backup directory hierarchy to be displayed to a user in a folder view. For example, user selection of virtual folder 502 causes presentation of a second user interface 600 as shown with reference to FIGS. 6 and 14, in accordance with an exemplary embodiment. Second user interface 600 may include a tree view 602 of the backup directory hierarchy and a folder view 604 of the backup directory hierarchy. As known to those skilled in the art, using tree view 602 of the backup directory hierarchy, a user can select a folder for which to display its content in folder view 604. For example, in the exemplary embodiment of FIG. 6, folder view 604 displays the folders and files backed up in the C drive of exemplary computing device 104a. A user can select a '+' or '−' icon 603 next to a folder icon to collapse or expand the hierarchical view of the backup directory hierarchy. Tree view 602 displays the directory structure of the backup directory hierarchy. Tree view 602 may be replaced with task pane 504 as known to those skilled in the art.

In an exemplary embodiment, the backup directory hierarchy is implemented as a namespace extension. The Microsoft® Windows shell uses a single hierarchical namespace to organize all objects, including files, storage devices, printers, and network resources. The Windows application can be thought of as the shell namespace viewer. Using a namespace extension, the Windows Explorer application presents data to a user as a virtual folder such as virtual folder 502. A namespace extension is a special common object model object that provides a mechanism for creating custom functionality for the Windows Explorer application. For example, using a namespace extension the Windows Explorer application can be controlled to create a virtual folder of files/folders/drives in the Windows shell. The backup directory hierarchy is a virtual folder that describes the location of actual files/folders/drives stored on or accessible from exemplary computing device 104a and selected for backup using backup and restore application 1412.

A namespace extension generally consists of two basic components: a data manager, and an interface between the data manager and the Windows Explorer application. Thus, there is a separation of functionality. The data manager knows the state of backup and restore application 1412, but has no user interface functionality. In contrast, the interface handles the user interface functionality, but does not intrinsically know the state of backup and restore application 1412. In the exemplary embodiment, backup/restore engine 1414 acts as the data manager for backup and restore application 1412 by maintaining the current backup status of each file/folder/drive. For example, backup/restore engine 1414 maintains the status flags in the backup status file.

Backup/restore user interface 1416 acts as the interface for backup and restore application 1412 by defining the folder objects and handling the interaction with the Windows Explorer application. The Windows Explorer application calls these components to allow users to view and interact with the backup directory hierarchy as if it were a collection of drives, folders, and files. The Windows Explorer application manages tree view 602, in which the virtual folder 502 is shown. Virtual folders may be defined as folder-like user interfaces that expose the functionality provided by a namespace extension. Unlike tree view 602, the Windows Explorer application does not directly control the contents of folder view 604. Instead, backup/restore user interface 1416 controls the display and management of the contents in folder view 604. Backup/restore user interface 1416 and backup/restore engine 1414 communicate with each other using a secure COM channel and shared registry access.

Folder view 604 displays the contents of a single folder selected, for example, in tree view 602. Folder view 604 may include a name column 606, a state column 608, a last backup column 610, a backup version number column 612, a purge date column 614, a number of files column 616, and a size column 618. Name column 606 includes a list 620 of file/folder/drive names at the selected directory level. For example, state column 608 includes a current backup state for each file/folder/drive names included in list 620 at the selected directory level. Last backup column 610 includes a last backup time and date for each file included in list 620. Backup version number column 612 includes a version number for each file included in list 620. Purge date column 614 includes a deletion date for each file/folder/drive included in list 620. Number of files column 616 includes a number of files in each file/folder/drive included in list 620. In an exemplary embodiment, number of files column 616 may include the number '1' for a file. Size column 618 includes a size of the files in each file/folder/drive included in list 620.

Referring again to FIGS. 4 and 14, in an operation 414, the files selected for backup are compressed. The files may be compressed singly, in multiple groups (i.e. each folder in a separate group), or into a single file as known to those skilled in the art. In an operation 414, the compressed file(s) is encrypted. An encryption system can execute various cryptographic algorithms that alternatively encrypt or decrypt data. As examples, an encryption system can implement the data encryption standard, the triple data encryption algorithm, the advanced encryption standard, etc. as known to those skilled in the art. In an exemplary embodiment, backup and restore application 1412 implements the Blowfish encryption algorithm with a 1024 bit key. The Blowfish encryption algorithm uses a private encryption key stored at exemplary computing device 104a. A copy of the private encryption keys is also stored in database 110 of server system 102. Data can be recovered only by using exactly the same key used to encipher the data. In an operation 418, the encrypted file(s) is sent to server system 102 and stored in database 110. For example, the encrypted file(s) may be sent to server system 102 using HTTPS to maintain the security of the data during transmission through network 106. Encrypting the file(s) and sending the encrypted files using a secure transmission protocol provides two layers of protection for the electronic files. Using the secure transmission protocol protects the file(s) during transmission. Encryption of the files before transfer protects the data that is stored at server system 102, for example, from employees that may attempt to view the stored electronic files that may contain personal information of the user.

In an operation 420, file/folder/drive icons are modified to indicate the backup status of the respective file/folder/drive. For example, backup/restore user interface 1416 may indicate to the Windows Explorer application that an overlay icon for file/folder/drive icons is provided. An overlay icon is placed over an existing icon representing the physical file/folder/drive in the Windows Explorer application. The Windows Explorer application calls backup/restore user interface 1416 for each file/folder/drive asking whether to use an overlay icon or not. Backup/restore user interface 1416 checks the status of each file/folder/drive using backup/restore engine 1414. Based on the returned status, backup/restore user interface 1416 tells the Windows Explorer application whether to use an overlay icon or not.

In an exemplary embodiment, overlay icons that include colored dots in the bottom left hand corner of the icon and are transparent everywhere else are used. For example, a blue dot overlay icon on a folder icon may indicate a folder in which all files in that folder (and its subfolders) are selected for backup. A gray dot overlay icon on a folder icon may indicate that only some subfolders and/or files have been selected for backup in that folder. A folder icon not marked by a dot may indicate that there are no files selected for backup in that folder or its subfolders. Backup/restore engine 1414 analyzes the backup directory hierarchy to determine the overlay icon appropriate for each folder/drive. A yellow dot overlay icon on a file icon may indicate a file that is awaiting backup because it is new or has been modified since the last backup. A green dot overlay icon on a file icon may indicate a file that is backed up and has not been modified since the last backup. The lack of any dot on a file icon may indicate the file is not selected for backup.

With reference to FIG. 7, a third user interface 700 of the file system of exemplary computing device 104*a* is provided to indicate the physical file/folder/drive in the Windows Explorer application. Third user interface 700 may include a name column 702, a size column 704, a type column 706, and a date/time modified column 708. Name column 702 includes a list of file/folder/drive names at the selected directory level. Size column 704 includes a size of each file/folder/drive included in name column 702 at the selected directory level. Type column 706 includes a type of each file/folder/drive included in name column 702 at the selected directory level. Date/time modified column 708 includes a last modification time and date for each file included in name column 702 at the selected directory level.

A folder icon 710 includes an overlay icon indicating a backup state of the folder. A folder icon 712 does not include an overlay icon which may indicate that no files are selected for backup in that folder or its subfolders. However, a user can choose to display the overlay icons or not based on the selection or de-selection of state indicator check box 306. Thus, a folder icon 712 that does not include an overlay icon may indicate that the user has de-selected state indicator check box 306. A file icon 714 includes an overlay icon indicating a backup state of the file. A file icon 716 does not include an overlay icon which may indicate that the file is not selected for backup.

Figure 8:
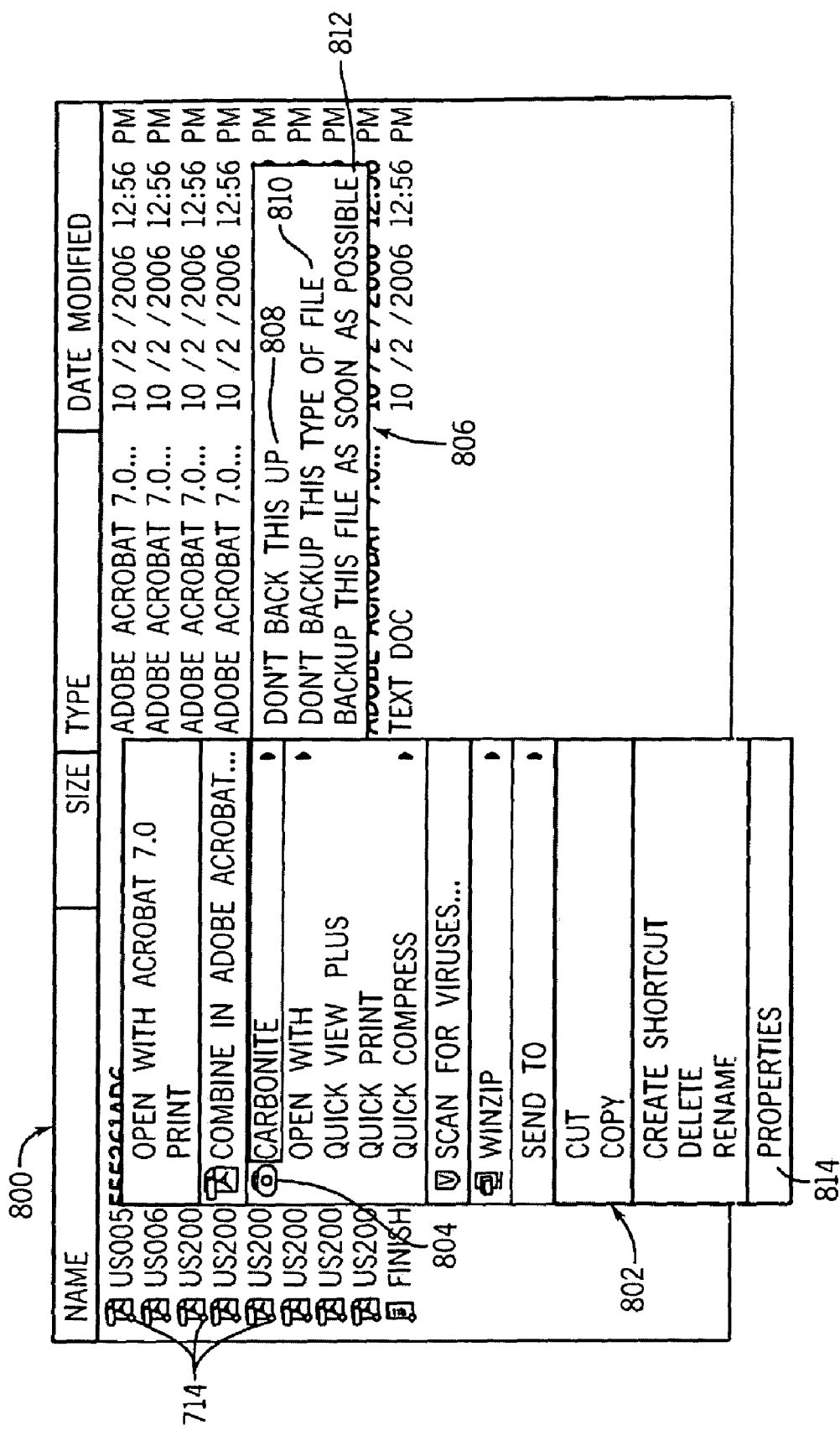
FIG. 8 depicts a fourth user interface of the file system including a pop-up menu in accordance with an exemplary embodiment.

In an exemplary embodiment, a user can select a file/folder/drive for backup or deselect a file/folder/drive from backup using an extension to a context menu. With reference to FIG. 8, a fourth user interface 800 of the file system of exemplary computing device 104*a* is provided which includes a context menu 802 of a selected file/folder/drive. Context menu 802 may be displayed for a selected file/folder/drive by a user right-clicking on the file/folder/drive. Selection of a menu item 804 presented to the user in context menu 802 causes display of a backup option menu 806. Backup option menu 806 may include a first option 808 that allows a user to request that the selected file/folder/drive not be backed up. In response to selection of first option 808 and after a predetermined period of time, the selected file/folder/drive is deleted from server system 102. In an exemplary embodiment, the predetermined period of time is 24 hours. The time delay allows a user to change their mind about removing the selected file/folder/drive from backup.

Backup option menu 806 further may include a second option 810 that allows a user to request that the file type of the selected file not be backed up. The file type generally is indicated by the file extension as known to those skilled in the art. For example, if the file type is a text document, selection of second option 810 changes the backup state of all text documents so that none of them are backed up. A user may individually select a text file for backup, however. For example, backup option menu 806 further may include a third option 812 that allows a user to request that the selected file/folder/drive be backed up as soon as possible.

Figure 9:
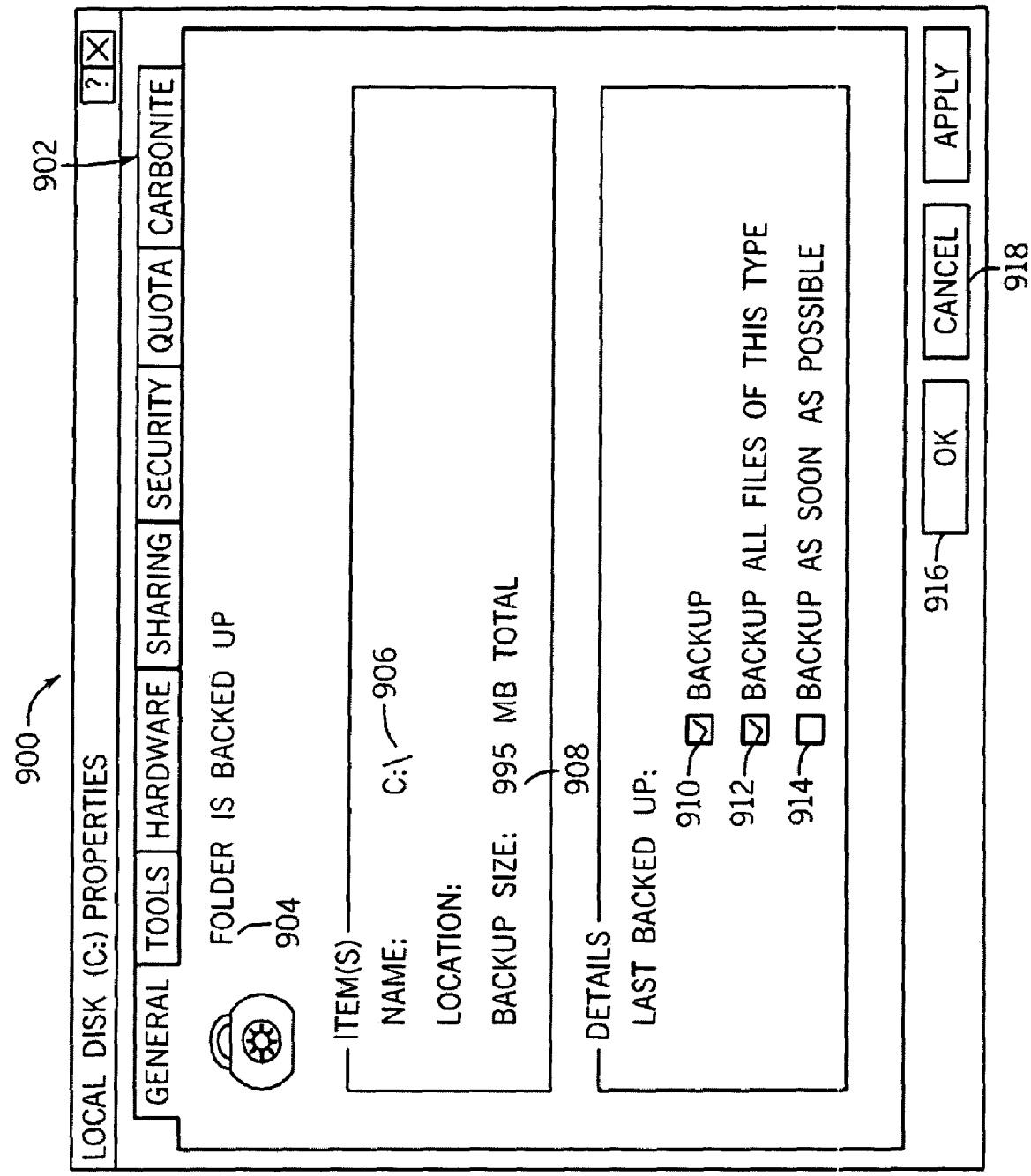
FIG. 9 depicts a first user interface of a properties window in accordance with an exemplary embodiment.

In an exemplary embodiment, a user can determine why a file/folder/drive will not be backed up by selecting a properties menu item 814 presented to the user in context menu 802. A "Properties" dialog box is opened and the user can select a tab in the Properties dialogue box which includes backup details. For example, with reference to FIGS. 8 and 9, a first properties dialog box 900 is provided which includes a tab 902. Selection of tab 902 in first properties dialog box 900 displays a folder state identifier 904, a file/folder/drive name indicator 906, a backup size indicator 908, a first backup check box 910, a second backup check box 912, a third backup check box 914, an OK button 916, and a Cancel button 918. Selection of first backup check box 910 adds the selected file/folder/drive to the files selected for backup. Thus, if a user selects second option 810 to exclude .mp3 files from backup processing, the user can select first backup check box 910 for a particular .mp3 file, and the particular .mp3 file is added to the files selected for backup processing.

Selection of second backup check box 912 allows a user to request that all files having the file type of the selected file be backed up. For example, if the file type is a text document, selection of second backup check box 912 changes the backup state of all text documents so that all of them are backed up. A user may individually de-select a text file for backup, however, using first backup check box 910. Selection of third backup check box 914 allows a user to request that the selected file/folder/drive be backed up as soon as possible. Selection of OK button 916 saves any changes to selections in first properties dialog box 900. Selection of Cancel button 918 cancels any changes to selections in first properties dialog box 900.

Referring to FIGS. 1, 2, 4, 6, and 14, in an operation 422, a status of each of the files selected for backup is monitored. Additionally, new files are identified based on the backup profile to determine if the new files should also be backed up. Backup/restore engine 1414 continuously scans exemplary computing device 104*a* for new and/or modified files to be backed up whether exemplary computing device 104*a* is connected to network 106 or not. In an operation 424, a determination is made concerning whether or not a file has been modified. If a file has been modified, processing continues at an operation 426. If a file has not been modified, processing continues at operation 422.

In an exemplary embodiment, modified files are identified using a standard Microsoft Windows operating system function ReadDirectoryChanges, which detects changes in directories and files. A call to the function ReadDirectoryChanges indicates the name and type of change to a file system object. If the call returns the name of a file selected for backup processing, the backup state flag and/or the most recent modification time in the backup status file may be changed to indicate that the file should be backed up. Additionally or alternatively, a scan of exemplary computing device 104*a* may be performed. A comparison between the status of each file to backup, as maintained in the backup status file, and the scan data may be performed to identify modified or new files. For example, a checksum value may be executed for a newly modified file and for the currently backed up version of the file using a variety of algorithms as known to those skilled in the art including cryptographic hash functions. If the calculated checksum values are different, the file has changed.

In an operation 426, a file state is set to backup. For example, backup state flags and/or the most recent modification time in the backup status file may be set to indicate that the modified file should be backed up. Additionally, state column 608 of folder view 604 may be changed to indicate that the file is pending backup.

In an operation 428, a determination is made concerning whether or not to initiate the backup of the changed/new files. If a file backup is to be initiated, processing continues at an operation 430. If a file backup is not to be initiated at the current time, processing continues at operation 422. For example, when backup/restore engine 1414 detects that a file has been modified, backup/restore engine 1414 may check to make sure that the file has remained unchanged for a predetermined period of time before the file is made eligible for backup. In an exemplary embodiment, the predetermined period of time is ten minutes. In an exemplary embodiment, a modified file is backed up once every 24 hours to give users the opportunity to restore the previous version if necessary. For example, if a user modifies a file and saves it, backup/restore engine 1414 waits ten minutes before backup of the modified file. If a user modifies the file again, backup/restore engine 1414 may wait up to 24 hours before backing up the file again. An immediate backup of the modified file can be requested by the user, however, by selecting third option 812 or third backup check box 914 for the modified file.

If exemplary computing device 104a is disconnected for an extended period of time, application icon 202 may change to a red color indicating that access to network 106 should be restored as soon as possible. As soon as access to network 106 is restored, backup/restore engine 1414 may initiate the transmission of updates.

In an operation 430, the backup directory hierarchy is updated. For example, state column 608 of folder view 604 may be changed to indicate that the file is backed up and last backup column 610 of folder view 604 may be updated to include the backup date and time. Additionally, new files may be added to the backup directory hierarchy. In an operation 432, the backup status file is updated. For example, the date of last backup of the file, the time of last backup of the file, and the backup state flag indicating the backup state of the file may be updated.

Figure 10:
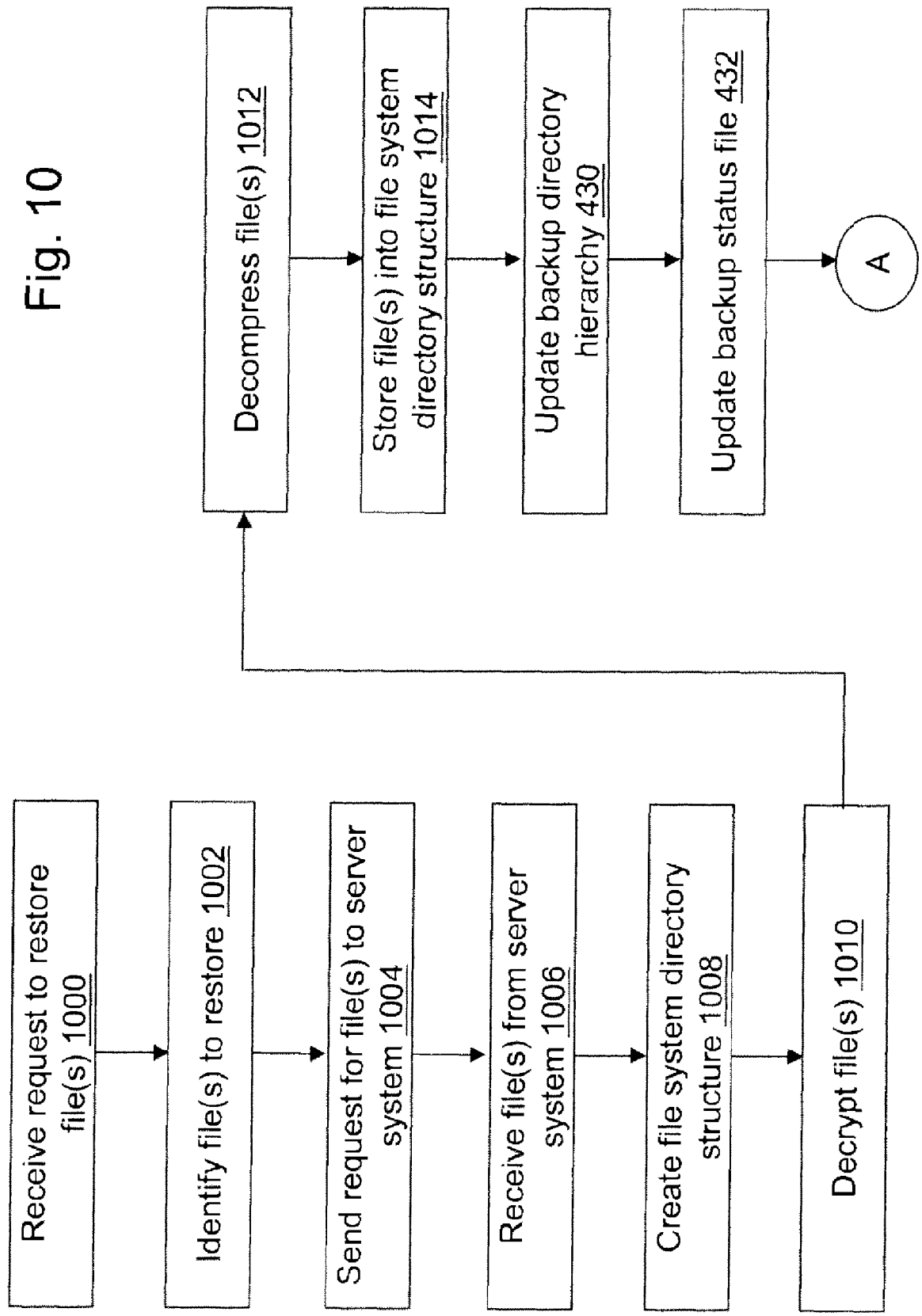
FIG. 10 is a flow diagram illustrating exemplary operations performed by a restore application in accordance with an exemplary embodiment.

With reference to FIGS. 5, 10, 14, exemplary operations associated with a restore process are described. Additional, fewer, or different operations may be performed, depending on the embodiment. The order of presentation of the operations of FIG. 10 is not intended to be limiting. In an operation 1000, backup and restore application 1412 receives a request to restore a file/folder/drive. For example, a user selects virtual folder 502 in first user interface 500. Virtual folder 502 displays the first level of the backup directory hierarchy, which contains a mirror image of the backed up files/folders/drives. A user can select a file, a group of files, a folder, a drive, etc. to restore. For example, with reference to FIGS. 11 and 14, a fifth user interface 1100 of the file system of exemplary computing device 104a is provided which includes a folder options menu 1106 of a 'C' drive 1104. An address bar 1102 indicates the parent folder of the currently displayed files/folders/drives.

Folder options menu 1106 may include a first option 1108, a second option 1110, a third option 1112, and a fourth option 1114. Selection of first option 1108 opens the selected folder for display in fifth user interface 1100 and updates address bar 1102 to indicate the selected folder. Selection of second option 1110 sends a request to backup and restore application 1412 to restore the selected folder/drive. Selection of third option 1112 sends a request to backup and restore application 1412 to restore the selected folder/drive to a different location on exemplary computing device 104a. The user is prompted to select a location as known to those skilled in the art.

Selection of fourth option 1114 sends a request to backup and restore application 1412 that the selected folder/drive is no longer selected for backup processing. Purge date column 614 of folder view 604 indicates the date a deselected folder/drive is removed from server system 102 as a result of user selection of fourth option 1114. In an exemplary embodiment, server system 102 maintains a copy of the selected folder/drive for at least 30 days from the time of selection of fourth option 1114.

As another example, with reference to FIGS. 1, 6, 11, 12, and 14, a sixth user interface 1200 of the file system of exemplary computing device 104a is provided which includes a file options menu 1202 of a file 1204. Address bar 1102 indicates the parent folder of the currently displayed files/folders/drives. File options menu 1202 may include a first option 1206, a second option 1208, and a third option 1210. Selection of first option 1206 sends a request to backup and restore application 1412 to restore the selected file. Selection of second option 1208 sends a request to backup and restore application 1412 to restore the selected file to a different location on exemplary computing device 104a. The user is prompted to select a location as known to those skilled in the art. Selection of third option 1210 sends a request to backup and restore application 1412 to no longer backup the selected file. Purge date column 614 of folder view 604 indicates the date a deleted file is removed from server system 102 as a result of user selection of third option 1210. In an exemplary embodiment, server system 102 maintains a copy of the selected file for at least 30 days from the time of selection of third option 1210.

Figure 13:
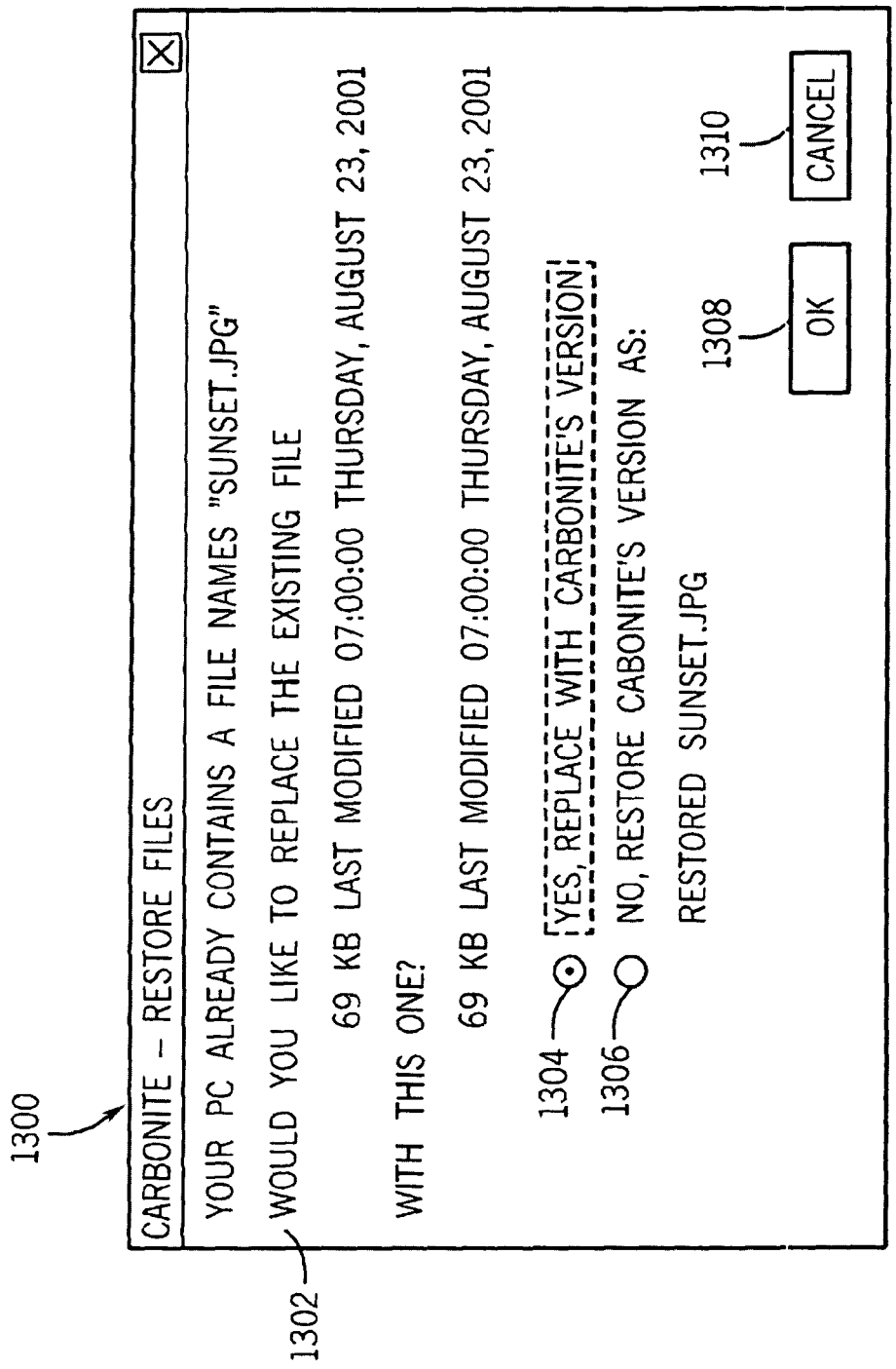
FIG. 13 depicts a restore query window in accordance with an exemplary embodiment.

In an operation 1002, the file(s) to restore are identified based on the user selections. With reference to FIGS. 13 and 14, a restore query window 1300 may be displayed to a user if one or more of the file(s) exists in the file system of exemplary computing device 104a. Restore query window 1300 may include descriptive text 1302, a "Yes" radio button 1304, a "No" radio button 1306, an OK button 1308, and a Cancel button 1310. Descriptive text 1302 asks the user if the file should be replaced or not. Selection of "Yes" radio button 1304 indicates that the file should be replaced in the file system of exemplary computing device 104a. Selection of "No" radio button 1306 indicates that the file should not be replaced in the file system of exemplary computing device 104a. Selection of OK button 1308 accepts the selected radio button option. Selection of Cancel button 1310 does not accept the selected radio button option.

In an operation 1004, the request to restore the file(s) is sent to server system 102. In an exemplary embodiment, the requested file(s) are mapped to the unique identifier for the file and the unique identifier is included with the request. In an operation 1006, the requested file(s) are received from server system 102.

In an operation 1008, a file system directory structure may be created. For example, if a disk of exemplary computing device 104a is replaced or a user replaces exemplary computing device 104a with a new computing device, the files may be restored to the replaced disk or new computing device. As a result, as the files are being restored to the replaced disk or new computing device, the file system directory structure is created as the files are restored. In an exemplary embodiment, a user may use a browser application 1400 to visit a webpage controlled by web server application 1500 at server 108. After the user logs into server 108, as known to those skilled in the art, a "Restore" tab may be selected. The user can select the files/folders/drives to restore to the replaced disk or new computing device using a user interface presented by browser application 1400. The files/folders/drives are organized as they were on exemplary computing device 104a. A user may be asked to "Exit Restore Mode" so that backup and restore application 1412 initiates backup processing. Alternatively, the "Exit Restore Mode" may be performed automatically when the user logs off server 108.

In an operation 1010, the received file(s) are decrypted. In an operation 1012, the decrypted file(s) are decompressed. In an operation 1014, the decompressed file(s) are stored to the appropriate location in the file system directory structure. In an operation 430, the backup directory hierarchy is updated. In an operation 432, the backup status file is updated. Processing continues at operation 420 shown with reference to FIG. 4.

In an exemplary embodiment, server system 102 maintains a copy of a file/folder/drive for at least 30 days from the time of deletion of the file/folder/drive at exemplary computing device 104a. As a result, a file/folder/drive which has been deleted accidentally can be restored. Purge date column 614 of folder view 604 indicates the date a deleted file is to be removed from server system 102.

With reference to FIG. 14, a user computing device 104a is shown in an exemplary embodiment. User computing device 104a may include a display 1402, input interface 1404, a computer-readable medium 1406, a communication interface 1408, a processor 1410, browser application 1400, backup and restore application 1412, backup/restore engine 1414, and backup/restore user interface 1416. Different and additional components may be incorporated into computing device 104a.

Display 1402 presents information to a user of computing device 104a as known to those skilled in the art. For example, display 1402 may be a thin film transistor display, a light emitting diode display, a liquid crystal display, or any of a variety of different displays known to those skilled in the art now or in the future.

Input interface 1404 provides an interface for receiving information from the user for entry into computing device 104a as known to those skilled in the art. Input interface 1404 may use various input technologies including, but not limited to, a keyboard, a pen and touch screen, a mouse, a track ball, a touch screen, a keypad, one or more buttons, etc. to allow the user to enter information into computing device 104a or to make selections presented in a user interface displayed on display 1402. Input interface 1404 may provide both an input and an output interface. For example, a touch screen both allows user input and presents output to the user.

Computer-readable medium 1406 is an electronic holding place or storage for information so that the information can be accessed by processor 1410 as known to those skilled in the art. Computer-readable medium 1406 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Computing device 104a may have one or more computer-readable media that use the same or a different memory media technology. Computing device 104a also may have one or more drives that support the loading of a memory media such as a CD or DVD.

Communication interface 1408 provides an interface for receiving and transmitting messages, files, and any other information communicable between devices using various protocols, transmission technologies, and media as known to those skilled in the art.

Processor 1410 executes instructions as known to those skilled in the art. The instructions may be carried out by a special purpose computer, logic circuits, or hardware circuits. Thus, processor 1410 may be implemented in hardware, firmware, software, or any combination of these methods. The term "execution" is the process of running an application or the carrying out of the operation called for by an instruction. The instructions may be written using one or more programming language, scripting language, assembly language, etc. Processor 104a executes an instruction, meaning that it performs the operations called for by that instruction. Processor 104a operably couples with display 1402, with input interface 1404, with computer-readable medium 1406, and with communication interface 1408 to receive, to send, and to process information. Processor 104a may retrieve a set of instructions from a permanent memory device and copy the instructions in an executable form to a temporary memory device that is generally some form of RAM. Computing device 104a may include a plurality of processors that use the same or a different processing technology.

Backup and restore application 1412 performs operations associated with backup and restore processes. Some or all of the operations and interfaces described with reference to FIGS. 2-13 may be embodied in backup and restore application 1412. The operations may be implemented using hardware, firmware, software, or any combination of these methods. With reference to the exemplary embodiment of FIG. 14, backup and restore application 1412 is implemented in software stored in computer-readable medium 1406 and accessible by processor 1410 for execution of the instructions that embody the operations of backup and restore application 1412. Backup and restore application 1412 may be written using one or more programming languages, assembly languages, scripting languages, etc. Backup and restore application 1412 may instantiate backup/restore engine 1414 and backup/restore user interface 1416.

With reference to FIG. 15, components of server 108 are shown in an exemplary embodiment. Server 108 may include display 1402, input interface 1404, computer-readable medium 1406, communication interface 1408, processor 1410, and web server application 1500. Different and additional components may be incorporated into server 108. Server 108 and/or database 110 store compressed and encrypted copies of the files selected for backup processing. Backup files may be organized on server 108 using the unique identifier for exemplary computing device 104a, the session identifier, the file identifier, and the file version number associated with each file. The server assigns the unique identifier for exemplary computing device 104a to a computer when it installs and registers backup and restore application 1412. The session identifier is created every time exemplary computing device 104a connects to server 108 and may start at one and increment each time a user connects to server 108. The file identifier is created by backup and restore application 1412 for each file selected for backup processing. The file version number distinguishes different versions of the same file and may be increments when a file is modified.

In an exemplary embodiment, the directory structure on server 108 is organized by the unique identifier for exemplary computing device 104a and the session identifier. The unique identifier for exemplary computing device 104a determines the base sub-directory for all files backed up from exemplary computing device 104*a*. Below each unique computer identifier sub-directory is a sub-directory for each session identifier. Below each session identifier sub-directory are all of the files backed up from exemplary computing device 104*a* during that session. The filenames may be constructed based on the unique identifier for exemplary computing device 104*a*, the session identifier, the file identifier, and the file version number. For example, C:\C317\S342\C317-S342-F000771-V000002 includes the absolute path and filename of a file stored at server 108. As a result, server 108 need not keep track of the original filename or pathname. A mapping of the original filenames to the filenames as stored on server 108 is maintained at exemplary computing device 104*a*, for example, in the backup status file.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. For example, the described exemplary embodiments focused on an implementation designed to operate on a computer system executing a Microsoft Windows based operating system. The present invention, however, is not limited to a particular operating environment. Those skilled in the art will recognize that the system and methods of the present invention may be advantageously operated on different platforms using different operating systems including but not limited to the Macintosh® operating system and UNIX® based operating systems. Additionally, the functionality described may be implemented in a single executable or application or may be distributed among modules that differ in number and distribution of functionality from those described herein without deviating from the spirit of the invention. Additionally, the order of execution of the functions may be changed without deviating from the spirit of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A computing device comprising:
    a processor;
    a user interface operably coupled to the processor, the user interface including a display;
    a communication interface operably coupled to the processor, the communication interface configured to communicate with a remote backup computer system using a publicly accessible communication network; and
    a computer-readable medium operably coupled to the processor, the computer-readable medium comprising instructions that, upon execution by the processor, perform operations comprising:
        defining a backup profile for the computing device, the backup profile designating files on the computing device for which backup processing is to be performed, the backup processing comprising maintaining current backup copies of the designated files at the remote backup computer system to thereby create a one-to-one correspondence between the designated files at the computing device and the backup copies of the designated files at the remote backup computer system;
        controlling the user interface to render on the display overlay icons representing backup states of the designated files, the overlay icons being rendered on the display at least partially overlapping file icons representing the designated files, the overlay icons being rendered on the display so as to provide an indication of (i) files that are designated for backup processing but for which a current backup copy is not stored at the remote backup computer system, (ii) files that are designated for backup processing and for which a current backup copy is stored at the remote backup computer system, and (iii) files that are not designated for backup processing;
        detecting that a current backup copy is not stored at the remote backup computer system for a file that has been designated for backup processing, the detected file being a file that has been added to the files designated for backup processing and/or a file that has changed;
        wherein controlling the user interface further comprises controlling the user interface to render at least one aspect of an overlay icon associated with the detected file to provide a first indication that the detected file is designated for backup processing but that a current backup copy of the detected file is not stored at the remote backup computer system;
        transmitting a backup copy of the detected file to the remote backup computer system for backup, wherein the transmitting is performed automatically responsive to detecting the change and without user interaction with the user interface; and
        wherein controlling the user interface further comprises controlling the user interface to modify at least one aspect of the overlay icon to change the first indication into a second indication to the user that the electronic file is backed up, and wherein the modification is performed automatically responsive to transmitting the backup copy and without user interaction with the user interface to modify the overlay icon.

2. A computer-readable storage medium including computer-readable instructions that, upon execution by a processor, perform a method for representing a backup state of a file system, the method comprising:
    defining a backup profile for the computing device, the backup profile designating files on the computing device for which backup processing is to be performed, the backup processing comprising maintaining current backup copies of the designated files at the remote backup computer system to thereby create a one-to-one correspondence between the designated files at the computing device and the backup copies of the designated files at the remote backup computer system;
    rendering on a display of the computing device overlay icons representing backup states of the designated files, the overlay icons being rendered on the display at least partially overlapping file icons representing the designated files, the overlay icons being rendered on the display so as to provide an indication of (i) files that are designated for backup processing but for which a current backup copy is not stored at the remote backup computer system, (ii) files that are designated for backup processing and for which a current backup copy is stored at the remote backup computer system, and (iii) files that are not designated for backup processing;

detecting that a current backup copy is not stored at the remote backup computer system for a file that has been designated for backup processing, the detected file being a file that has been added to the files designated for backup processing and/or a file that has changed;

wherein the rendering further comprises rendering at least one aspect of an overlay icon associated with the detected file to provide a first indication that the detected file is designated for backup processing but that a current backup copy of the detected file is not stored at the remote backup computer system;

transmitting a backup copy of the detected file to the remote backup computer system for backup, and wherein the transmitting is performed automatically responsive to detecting the change and without user interaction with the user interface; and wherein the rendering further comprises modifying at least one aspect of the overlay icon to change the first indication into a second indication to the user that the electronic file is backed up, wherein the modifying is performed automatically responsive to transmitting the backup copy and without user interaction with the user interface to modify the overlay icon.

3. A method for representing a backup state of a file system, the method comprising:

defining a backup profile for the computing device, the backup profile designating files on the computing device for which backup processing is to be performed, the backup processing comprising maintaining current backup copies of the designated files at the remote backup computer system to thereby create a one-to-one correspondence between the designated files at the computing device and the backup copies of the designated files at the remote backup computer system;

rendering on a display a of the computing device overlay icons representing backup states of the designated files, the overlay icons being rendered on the display at least partially overlapping file icons representing the designated files, the overlay icons being rendered on the display so as to provide an indication of (i) files that are designated for backup processing but for which a current backup copy is not stored at the remote backup computer system, (ii) files that are designated for backup processing and for which a current backup copy is stored at the remote backup computer system, and (iii) files that are not designated for backup processing;

detecting that a current backup copy is not stored at the remote backup computer system for a file that has been designated for backup processing, the detected file being a file that has been added to the files designated for backup processing and/or a file that has changed;

wherein the rendering further comprises rendering at least one aspect of an overlay icon associated with the detected file to provide a first indication that the detected file is designated for backup processing but that a current backup copy of the detected file is not stored at the remote backup computer system;

transmitting a backup copy of the detected file to the remote backup computer system for backup, wherein the transmitting is performed automatically responsive to detecting the change and without user interaction with the user interface; and wherein the rendering further comprises modifying at least one aspect of the overlay icon to change the first indication into a second indication to the user that the electronic file is backed up, wherein the modifying is performed automatically responsive to transmitting the backup copy and without user interaction with the user interface to modify the overlay icon.

4. The method of claim 3, further comprising updating a backup directory hierarchy of the computing device, wherein the backup directory hierarchy indicates a backup status of the designated files, and further wherein the backup directory hierarchy is a virtual folder created in the file system of the computing device.

5. The method of claim 4, wherein the virtual folder is created using a namespace extension to the file system of the computing device.

6. The method of claim 4, wherein the backup directory hierarchy indicates a location of the designated files in the file system of the computing device.

7. The method of claim 3, wherein the at least one aspect of the overlay icon includes a color of the overlay icon, and wherein the backup state is indicated using a first color for the first indication provided by the overlay icon and a second color, different than the first color, for the second indication provided by the overlay icon.

8. The method of claim 3, further comprising allowing a user to change the backup state of the designated files by performing an icon selection operation and by selecting a menu item from a plurality of menu items presented to the user.

9. The method of claim 3, further comprising encrypting the designated files before sending the backup copies of the designated files to the remote backup computer system.

10. The method of claim 3, wherein the backup copies are transmitted using a secure file transfer protocol.

11. The method of claim 3, further comprising monitoring an edit time of the detected file and sending the backup copy of the detected file a predetermined period of time after the edit time.

12. The method of claim 3, wherein at least some of the designated files reside in a folder in the file system of the computing device, and wherein the first icon represents the folder.

13. The method of claim 3, wherein at least some of the designated files reside in a drive in the file system of the computing device, and wherein the first icon represents the drive.

14. The method of claim 3, further comprising allowing a user to generate a request to restore a selected or more one of the designated files by performing an icon selection operation associated with the selected files.

15. The method of claim 14, further comprising:
sending to the second computer system, using the network, the request to restore the selected files;
receiving the copy of the selected files from the remote backup computer system using the network; and
storing the received copy of the selected files in the file system of the computing device.

16. The method of claim 15, wherein the copy of the selected file is received using a secure file transfer protocol, and further comprising decrypting the selected file before storing the received copy.

17. The method of claim 3, further comprising:
selecting the at least one electronic file for backup based on a backup profile defined for the computing device as part of an installation process of a backup application; and
sending an initial copy of the at least one electronic file to the second computer system using the network.

18. The method of claim 3, wherein the copy of the at least one electronic file is sent to the second computer system when use of an input interface of the computing device is not detected.

19. The method of claim 3, wherein the backup profile is defined (i) as part of an installation process of a backup application, and/or (ii) responsive to user inputs indicating files, folders, and/or drives in a file system of the computed device to be designated for backup processing.

20. The method of claim 3, wherein the files that are not designated for backup processing are indicated by the lack of any overlay icon on the respective file icon.

* * * * *